July 7, 1953 — R. O. BILL — 2,644,696
CONVERTIBLE SPRING AND HYDRAULIC LOADING MEANS FOR VEHICLES
Filed Nov. 5, 1949 — 3 Sheets-Sheet 1

Inventor
Robert O. Bill
By Philip A. Friedell
Attorney

July 7, 1953  R. O. BILL  2,644,696
CONVERTIBLE SPRING AND HYDRAULIC LOADING MEANS FOR VEHICLES
Filed Nov. 5, 1949  3 Sheets-Sheet 2
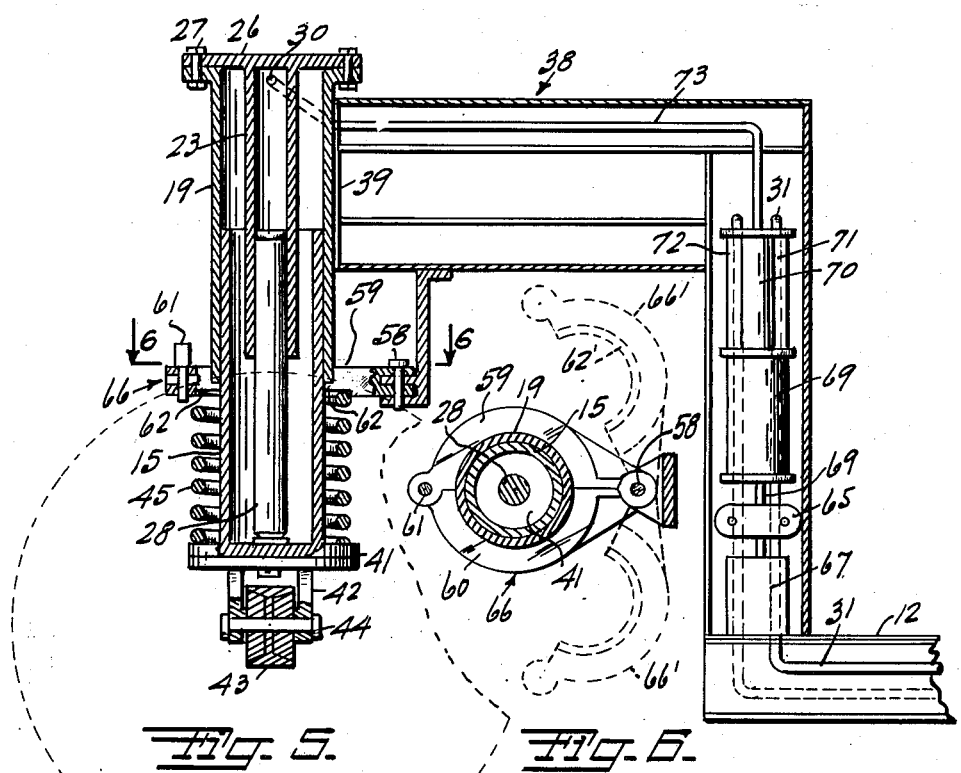
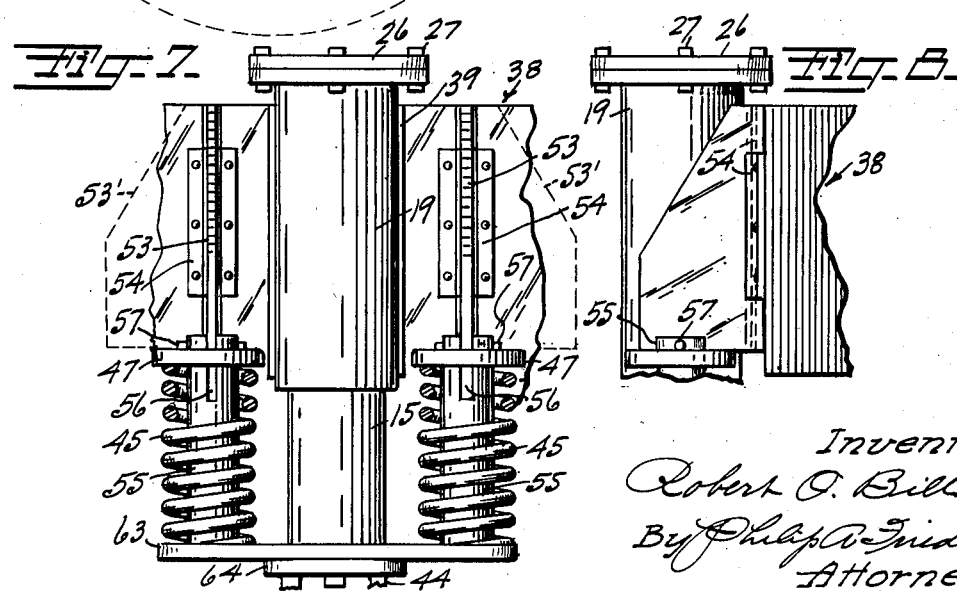
Inventor
Robert O. Bill
By Philip A. Tridell
Attorney

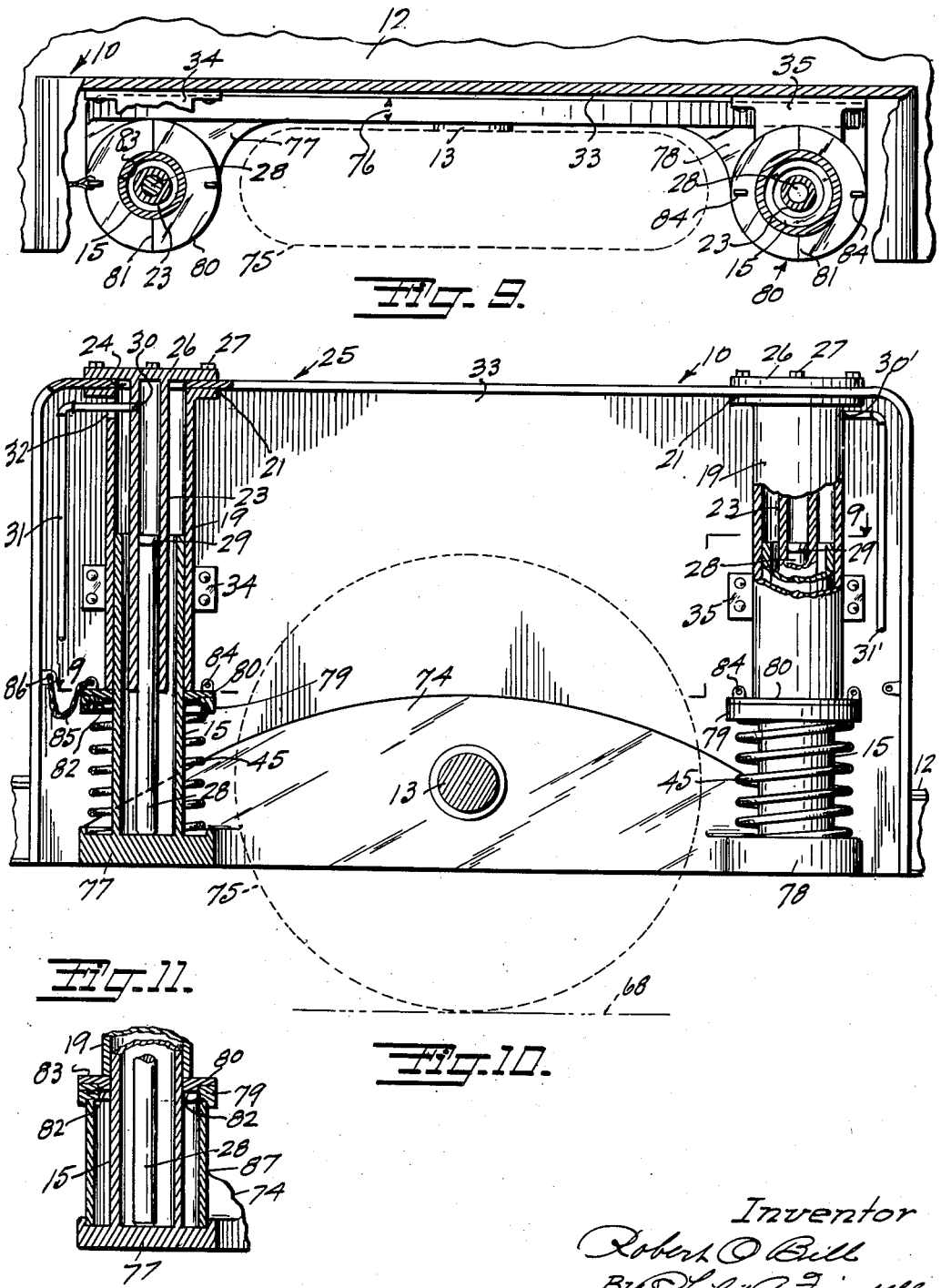

Patented July 7, 1953

2,644,696

UNITED STATES PATENT OFFICE 2,644,696

CONVERTIBLE SPRING AND HYDRAULIC LOADING MEANS FOR VEHICLES

Robert O. Bill, San Leandro, Calif.

Application November 5, 1949, Serial No. 125,810

4 Claims. (Cl. 280—44)

1

This invention relates to improvements in vehicles which are equipped with body elevating and lowering means, and provides a means for transferring the load to springs for travel of the vehicle, with the elevating and lowering means available for use at will, thus providing a vehicle which is spring supported with the load taken off the hydraulic mechanism for traveling, while permitting the bed of the vehicle to be lowered to ground level for loading or unloading.

This invention is applicable to the rear ends of trucks the beds of which are provided with elevating and lowering means, such as that disclosed in my copending application Serial Number 63,694, filed December 6, 1948, now Patent No. 2,560,715, July 15, 1951; to the trailer disclosed in my application Serial Number 27,395, filed May 17, 1948, now abandoned, and Serial Number 34,963, filed June 24, 1948, now Patent No. 2,560,714, July 17, 1951 and other related types of vehicles, and is a modification of my copending application, Serial Number 122,746 filed October 21, 1949 for Hydraulic Vehicle Body Elevating and Lowering Means which discloses the hydraulic means for elevating and lowering the body as illustrated in this application.

With this invention, when a destination is reached the body of the vehicle can be lowered to rest on the supporting surfaces such as a roadway or platform, or when used in orchards or on farms, directly on the ground. This provides for rapid, easy and convenient loading or unloading of the vehicle, and, when the vehicle is to be moved, the body can be elevated and the load carried by the hydraulic lifting devices, or the load can be transferred to springs, freeing the hydraulic devices of the load.

The objects and advantages of the invention are as follows:

First, to provide a vehicle with elevating and lowering means including guiding means, and with spring means for interchange from hydraulic to spring loading at will.

Second, to provide a vehicle equipped with elevating and lowering means for the body, with spring means, and means for transferring the load from one means to the other at will.

Third, to provide a vehicle with load carrying springs and with hydraulic elevating and lowering means, and with means for transferring the load for conversion from hydraulic loading to spring loading for travel, and from said spring loading back to hydraulic loading for loading or unloading the vehicle.

Fourth, to provide means as outlined which is

2 simple in construction, positive in operation, easily controlled, and economical to construct.

In describing the invention reference will be had to the accompanying drawings, in which:

Fig. 5 is a side elevation of the forward end of a trailer showing the invention applied thereto and illustrated in section.

Fig. 6 is a top plan view of the retractable spring seat for converting the front end of the vehicle from hydraulic support to spring support.

Fig. 7 is a front elevation of the invention as applied to the forward end of a trailer and showing a modification of that illustrated in Fig. 5.

Fig. 8 is a fragmentary side elevation of Fig. 7.

Fig. 9 is a top plan view of a rear wheel mounting, shown partly in section with the top wall of the wheel guard broken away, and showing a modification which reduces the required depth of the wheel guard and therefore provides more space between the guards, and corresponds to a section taken on line 9—9 of Fig. 10.

Fig. 10 is a side elevation of the modification shown in Fig. 9, and is partly shown in section.

Fig. 11 is a fragmentary view showing a method of dead loading the truck when spring loading is not desirable.

Figures 1, 2:
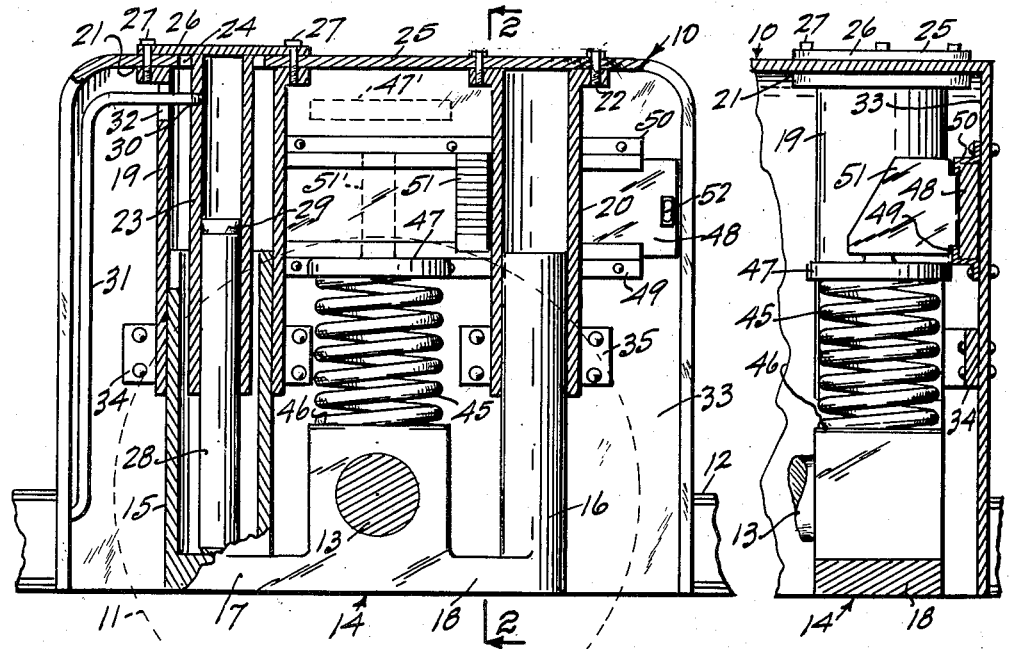
Fig. 1 is a side sectional elevation of a rear wheel mounting for trucks or trailers showing the invention.
Fig. 2 is a section taken on line 2—2 of Fig. 1.

The invention is illustrated as applied to combination elevating and lowering means and guiding means as disclosed and claimed in my copending application Serial Number 122,746 filed October 21, 1949 and consisting, for the rear end of the vehicle, of a wheel housing or fender 10 which is provided for the rear wheel 11 or wheels, and which wheel housing is made rigid with the bed 12 of the vehicle and therefore forms a part thereof; this wheel housing being made sufficiently strong and rigid to support its portion of the vehicle when loaded to capacity. This construction applies only to wheels the direction of travel of which is fixed, such as the rear wheels of a truck, trailer, or semi-trailer, and includes a stub axle 13 which is flexed in a depending crosshead 14, with the wheel rotatable on the axis. A pair of sleeves 15 and 16 are respectively formed integral with or fixed to the respective arms 17 and 18 of the cross head and project upwardly in parallel.

Another pair of sleeves 19 and 20 are respectively fixed to the underside of the top member of the wheel housing as indicated at 21 and 22 and therefore form an integral part of the bed, and are slidable over the sleeves 15 and 16, forming two telescopic guides.

The hydraulic jack consists of a cylinder 23 which is freely insertible through a passage 24 formed through the top member 25 of the wheel housing, and terminates in a head 26 by which it is bolted down on the top member as indicated at 27.

A plunger 28 operates within this cylinder and has suitable sealing means such as a cup leather piston packing 29 secured to its upper end, and a pressure fluid connection 30 is provided for the pressure fluid line 31; a suitable passage 32 being provided through the sleeve 19 for making the connection to the cylinder.

The other telescopic pair of sleeves may include the hydraulic jack but has been found unnecessary for normal loading, therefore is shown as merely consisting of the telescopic guide the function of which is to maintain the alignment of the stub axle so that the wheel will track along the path of travel.

As will be noted, the sleeves 19 and 20, in addition to being fixed to the underside of the top member 25, are also fixed to the back member 33 of the wheel housing by brackets 34 and 35, near the lower end, thus providing an extremely rigid mounting for the telescopic guides.

Referring to Fig. 5, the same elevating and lowering and guiding means is provided for the forward end, except, instead of having a wheel housing for support, the sleeve 19 is supported by a gooseneck 38 to which it is bracketed as indicated at 39, but the sleeve 19 is supported by a base 41 having a yoke 42 which spans the front axle 43 and is pivotally supported thereby as indicated at 44, the front and rear axles forming supports for the vehicle and being supported by the vehicle wheels.

In combination with the preceding structures, or other elevating and lowering means to which it is adaptable, the invention consists of one or more springs 45 together with means for interposing the spring or springs between the load and the support, with the springs having one end fixed to a cooperative part of the vehicle, and the means for interposing being movable to a position where the load is transferred through the spring to the support.

As illustrated, for the rear end of the vehicle, the spring is seated on the top of the stub axle bracket as indicated at 46 and is suitably fixed thereto to prevent displacement or loss, and a cap 47 is provided for the other end of the spring.

The converting means or load carrying member can be of any one of several different forms, and in Fig. 1 is illustrated as consisting of a support 48 which is horizontally slidable in slideways 49 and 50 back of the telescopic guides and which includes a forwardly projecting head 51 integral therewith and which is shown in non-cooperative position and being movable to the dotted position 51' through the medium of the handle 52 or other suitable means, so that the load is transferred from the vehicle body, through the wheel housing, support 48—51, through the spring, to the axle cross head and thence through the axle to the wheel.

Figures 3, 4:
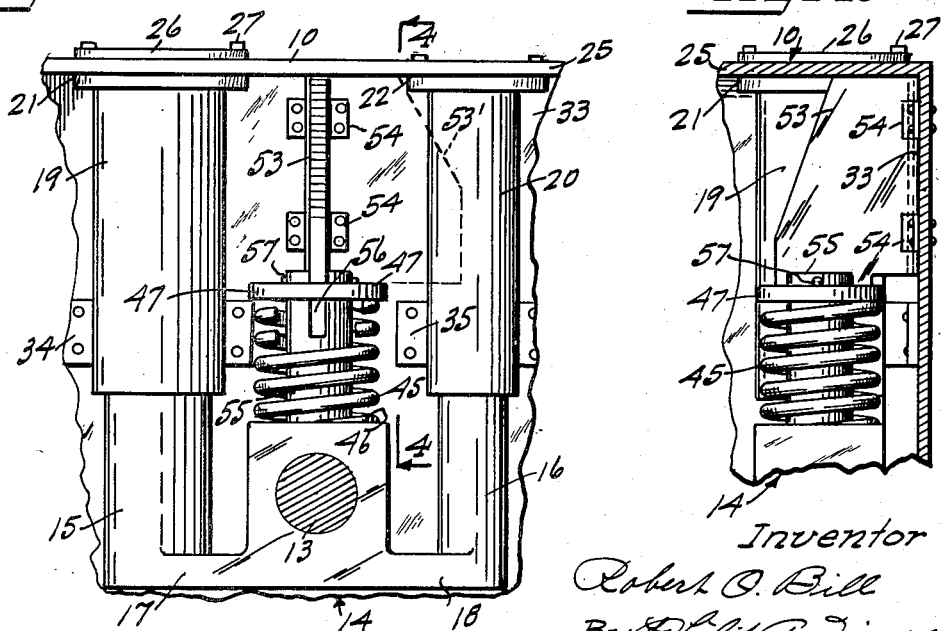
Fig. 3 is a fragmentary view similar to Fig. 1 but illustrating a modification of the incention.
Fig. 4 is a section taken on line 4—4 of Fig. 3.

A modification is shown in Fig. 3, in which a support 53 is hinged to the back 33 of the wheel housing as indicated at 54 and which support can be folded back flat against the back wall as indicated at 53', as the support will clear the telescopic guide sleeve 20. In this case, the spring may be mounted as in Fig. 1, but preferably is mounted over a core 55 which is provided with a diametric slot 56 in which the support 53 will slidably fit, and, the spring cap 47 is shown as retained by pins 57.

The construction for the forward end of the trailer is identical except that the hinged member is in the form of a clamp-like device, being hinged to the goose neck as indicated at 58 and consisting of two parts 59 and 60 which are hinged together and having means such as a pin 61 for securing the two members in closed position, in which position the internal flange 62 engages under the sleeve 19 but is free of the sleeve 15, and forms the upper spring seat.

As illustrated in Figs. 7 and 8, two springs are provided, on diametrically opposite sides of the guide, the head 63 being sufficiently wide to accommodate both springs and consisting of one part of a fifth wheel which in this case is necessary for this type of swivel axle, the other part of the fifth wheel including the yoke 44, being indicated at 64.

This construction is identical with that shown in Figs. 3 and 4 for the rear end and includes the cores 55, spring caps 47, the support 53 hinged to the front of the goose-neck as indicated at 54, the retaining pins 57 for the spring cap, and the slot 56, thus operating in exactly the same way.

The modification illustrated in Figs. 9 and 10 permits the installation of comparatively shallow wheel guards, thereby appreciably increasing the clear space between the guards on the opposite sides of the vehicle, and is the result of placing the guides and jacks respectively directly in front of and to the rear of the wheel and this is accomplished by making the cross head 74 greater in length than the diameter of the tire 75 and relatively thin as indicated at 76 with just sufficient resistance to twisting to rigidly support the stub axle 13 under full load on the bed. An outwardly projecting seat member is formed integral with each end of this cross member as indicated at 77 and 78, with the lower guide sleeves 15 projecting vertically with their axes in alignment with the diametric axis of the tire, and with these seat members forming seats for the compression springs 45; the remainder of the structure being identical with those previously described, except that due to the great span it is advisable to have a hydraulic jack mounted in each guide as shown, and, a different type of load transfer apparatus appears necessary because the wing type or clamp type would hardly operate properly in the small space between the upper sleeve and the wall 33 of the guard, therefore a ring type seat 79 is provided for the upper end of the spring and has a bore which will freely clear the upper sleeve 19; and a washer 80 is split in half as indicated at 81 and has a pilot 82 to freely fit in the bore in the ring type spring seat to lock the washer in position, and the bore 83 in this washer is a slip fit on the sleeve 15.

Suitable means is provided for handling these half washers, such as eyelets 84 by which they may be attached to the wheel guard as by a flexible chain or cable 85 and eyelet 86.

With this arrangement, the bed is elevated sufficiently high so that the washer halves can be placed in position and is then lowered until the lower end of the upper sleeve 19 rests on the washer, transferring the load from the hydraulic jacks to the springs; and if the vehicle bed is to be lowered, the bed is again raised, the washer halves removed, after which the bed can be lowered to the ground.

Fig. 11 shows a method of transferring the load from the hydraulic jacks directly to the axles, and merely consists of a sleeve 87 which replaces the spring in the other views, the operation being identical with spring loading, but providing dead loading which is sometimes desirable.

When the trailer or truck is stopped and to be unloaded, the pump 65 is set in operation to elevate the vehicle sufficiently to free the supports such as the support 51, or the hinged members of the spring cap 66 or hinged supports 53 which must be raised out of the slots 56. The supports at all points of support are moved out of cooperative relation to the springs, the bar 48 being slid to one side until the support contacts the sleeve 20, and the hinged members being swung back as indicated at 53' or 66'. This frees the springs. The pump 65 is now reversed or the fluid is otherwise released to return to the supply tank 67, permitting the vehicle bed 12 to lower to the plane of the support for the wheels indicated at 68.

When the vehicle is loaded, the pump 65 is again set in operation, delivering fluid under pressure to the master cylinder 69 which in turn forces fluid from the secondary cylinders 70, 71 and 72 through the conduit 73 to the head hydraulic jack, and through the conduits 31 to the rear jacks, the vehicle being elevated sufficiently to permit moving the supports into cooperation with the springs, after which the fluid is released, transferring the load in its entirety to the springs.

I claim:

1. Convertible elevating and lowering means and spring loading means for a vehicle having a bed and having axles comprising; an axle head for each axle and supported thereby; a telescopic guide and elevating and lowering means for each axle head and each comprising an inner sleeve and an outer sleeve, one slidable within the other with the inner sleeve fixed at its lower end to the axle head and the outer sleeve fixed to the bed; a hydraulic jack sealed within said telescopic guide member for exclusion of dirt and having a cylinder head bolted to the top of said outer sleeve with its plunger cooperating with said axle head, with said hydraulic jack removable and replaceable at will by detachment of said cylinder head from said top of said outer sleeve without disturbing the telescopic guide; a compression spring seated on each axle head, and a load carrying member supported by said bed and movable to two positions, in one of which said load carrying member cooperates between the top of said spring and the bed for support of the bed by the spring, and the load is transferred from the hydraulic jack to the spring, and in the other of which the load carrying member is non-cooperative and the spring is free with the load transferred to the hydraulic jack, and means for moving said load carrying member to either of its two positions.

2. In a vehicle having rear stub axles and wheels therefor, a crosshead for each stub axle, with the axle fixed therein, a first sleeve member for each end of the cross head and having its lower end fixed thereto with the sleeve members projecting vertically in parallel; a second sleeve member slidable on each first sleeve member to form a telescopic guide; a vehicle bed having a wheel housing having a top wall and a back wall with the second sleeve members having their upper ends fixed to the underside of the top wall and being fixed adjacent their lower ends to said back wall; a hydraulic jack comprising a cylinder and a plunger and a head for the cylinder fixed to the top surface of the top wall with the jack projecting into the telescopic guide and with the plunger cooperating with the crosshead, a compression spring mounted on said crosshead between said telescopic guides, and a load carrying member mounted on said wheel housing and slidable to two positions in one of which the load carrying member cooperates with the top of the spring to transfer the load on the wheel housing from the hydraulic jack to the spring, and in the other of which the load is transferred to the hydraulic jack with the spring free.

3. A vehicle having a bed and an axle, elevating and lowering means cooperative between said bed and said axle, two spring supports respectively supported by said bed and said axle and out of cooperative relation to said elevating and lowering means, a spring cooperative between said spring supports and having one of its end mounted on one of said spring supports, with the other one of said spring supports being movable to two positions, respectively to and from a position to engage said spring at the other of its ends when the bed is in an elevated position, to transfer the load of the bed for support by the elevating and lowering means or by the spring, at will; said elevating and lowering means comprising a hydraulic jack; guiding means cooperative between said bed and said axle and comprising a pair of telescopic cylinders one slidable within the other and each having a head with the respective heads supported by the bed and by the axle, and said hydraulic jack being completely enclosed within said telescopic cylinders for exclusion of dirt, and said jack cooperating between said heads, and said spring being mounted externally of said telescopic cylinders.

4. A vehicle having a frame, an axle for each side of said frame, a crosshead fixedly supported centrally on each axle and having a vertical plunger at each end with one of said plungers being tubular, a cylinder for each plunger to provide telescopic guides between the frame and the crosshead, a hydraulic jack housed within the telescopic guide having the tubular plunger and cooperating between the cross head and the upper end of the cylinder, a compression spring supported on a vertical axis by said crosshead and interposed between said telescopic guides, and a seat for the upper end of said spring, a load transfer member for each side of the frame and adjustable on said frame to two positions in one of which said load transfer member clears said spring seat to free the spring for support of the frame by the hydraulic jack, and in the other of which the load transfer member engages said spring seat for support of the frame by the compression spring.

ROBERT O. BILL.

References Cited in the file of this patent
UNITED STATES PATENTS

| Number | Name | Date |
|---|---|---|
| 2,304,780 | De Fries | Dec. 15, 1942 |
| 2,480,909 | Davis | Sept. 6, 1949 |
| 2,495,449 | Francis | Jan. 24, 1950 |